(12) United States Patent
Koito et al.

(10) Patent No.: US 11,719,984 B2
(45) Date of Patent: Aug. 8, 2023

(54) LIGHT CONTROL DEVICE AND ILLUMINATION DEVICE

(71) Applicant: Japan Display Inc., Tokyo (JP)

(72) Inventors: Takeo Koito, Tokyo (JP); Tae Kurokawa, Tokyo (JP); Masashi Mitsui, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/870,852

(22) Filed: Jul. 22, 2022

(65) Prior Publication Data

US 2022/0357614 A1    Nov. 10, 2022

Related U.S. Application Data

(63) Continuation of application No. PCT/JP2020/046753, filed on Dec. 15, 2020.

(30) Foreign Application Priority Data

Jan. 24, 2020  (JP) .................................. 2020-010235

(51) Int. Cl.
*G02F 1/1347* (2006.01)
*G02F 1/1333* (2006.01)
(Continued)

(52) U.S. Cl.
CPC .......... *G02F 1/1347* (2013.01); *G02F 1/1337* (2013.01); *G02F 1/1343* (2013.01);
(Continued)

(58) Field of Classification Search
None
See application file for complete search history.

(56) References Cited

U.S. PATENT DOCUMENTS

2010/0149444 A1   6/2010   Hikmet et al.
2011/0234934 A1*  9/2011   Chang ................. G02F 1/13471
                                                              349/74
(Continued)

FOREIGN PATENT DOCUMENTS

JP         61-138922 A      6/1986
JP        2010-525388 A     7/2010
(Continued)

OTHER PUBLICATIONS

International Search Report and Written Opinion dated Mar. 9, 2021, received for PCT Application PCT/JP2020/046753, filed on Dec. 15, 2020, 12 pages including English Translation.

*Primary Examiner* — Phu Vu
(74) *Attorney, Agent, or Firm* — Xsensus LLP

(57) ABSTRACT

According to one embodiment, a light control device includes a first liquid crystal cell, a second liquid crystal cell and a polarized light conversion element disposed between the first liquid crystal cell and the second liquid crystal cell. One substrate of an pair of substrates of each of the first liquid crystal cell and the second liquid crystal cell includes an insulating substrate, a plurality of first electrodes arranged along one direction on the insulating substrate and formed in a strip shape, a first inorganic insulating film covering the first electrodes and a plurality of second electrodes intersecting the first electrodes on the first inorganic insulating film and formed in a strip shape.

18 Claims, 8 Drawing Sheets

(51) Int. Cl.
*G02F 1/1335* (2006.01)
*G02F 1/1337* (2006.01)
*G02F 1/1343* (2006.01)

(52) U.S. Cl.
CPC .... *G02F 1/13471* (2013.01); *G02F 1/133345* (2013.01); *G02F 1/133528* (2013.01)

(56) References Cited

U.S. PATENT DOCUMENTS

| | | |
|---|---|---|
| 2018/0180968 A1 | 6/2018 | Chin |
| 2018/0196318 A1 | 7/2018 | Presniakov et al. |
| 2018/0284560 A1* | 10/2018 | Yata ................. G02F 1/133526 |
| 2019/0025657 A1* | 1/2019 | Presniakov ....... G02F 1/134363 |
| 2019/0094650 A1* | 3/2019 | Gao ................. G02F 1/134309 |
| 2019/0129245 A1* | 5/2019 | Nakanishi ......... G02F 1/133553 |
| 2019/0204709 A1 | 7/2019 | Fang et al. |

FOREIGN PATENT DOCUMENTS

| | | |
|---|---|---|
| JP | 2010-230887 A | 10/2010 |
| JP | 2018-106142 A | 7/2018 |
| JP | 2019-86539 A | 6/2019 |

\* cited by examiner

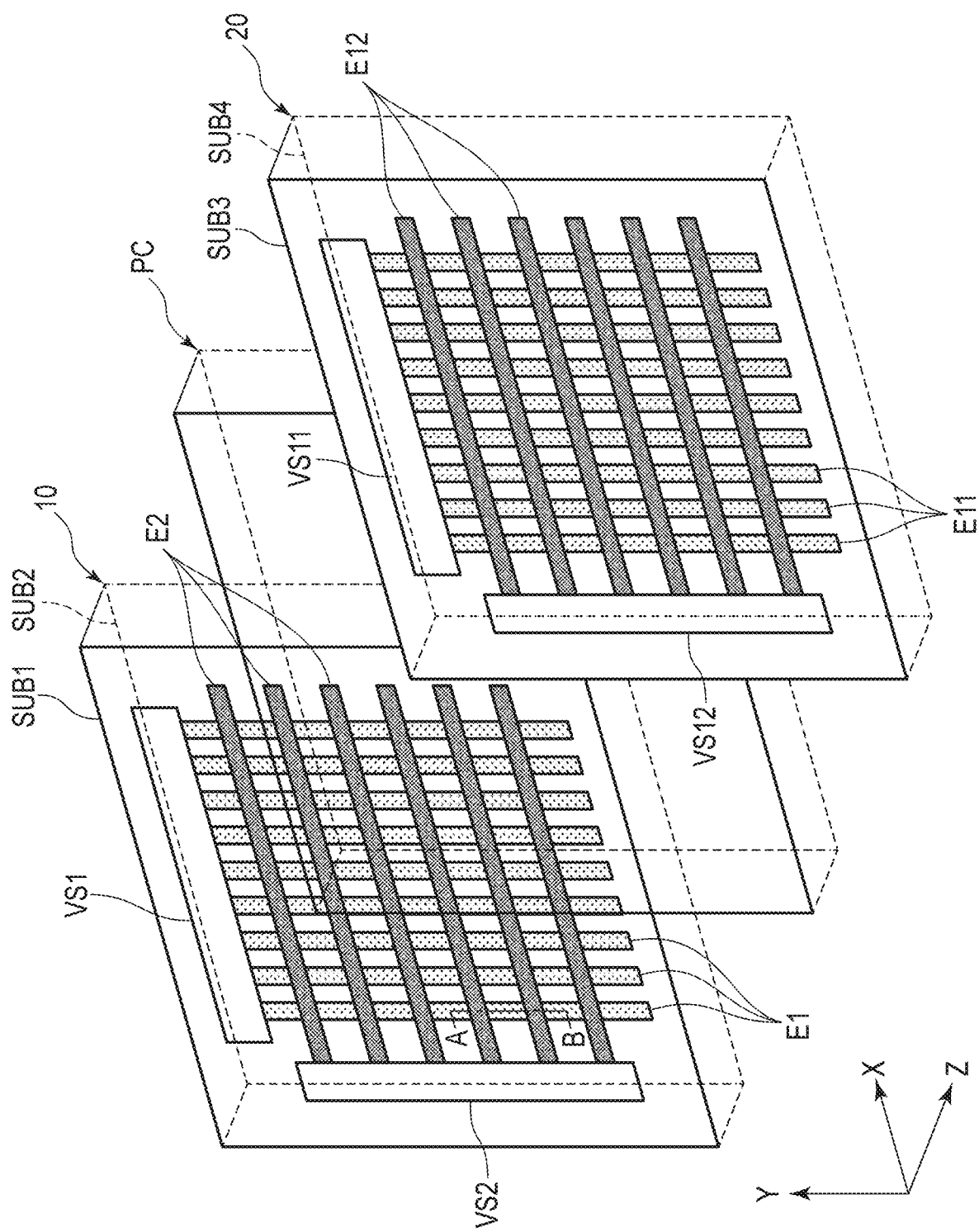
F I G. 2

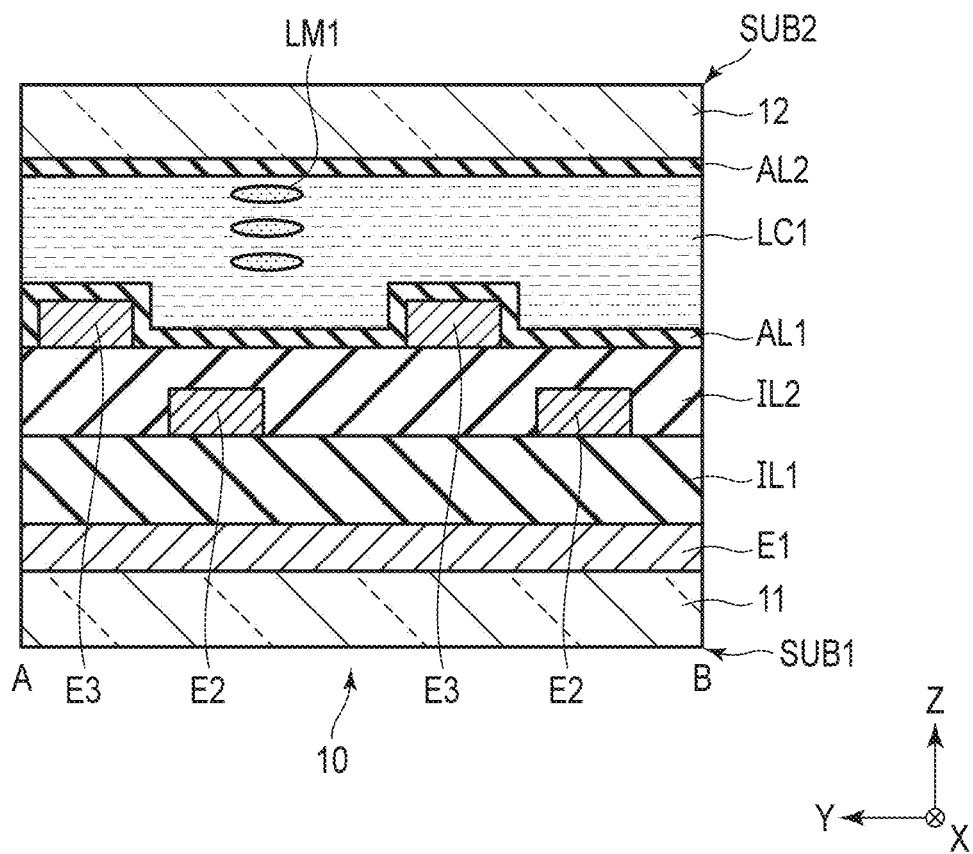
F I G. 6

LIGHT CONTROL DEVICE AND ILLUMINATION DEVICE

CROSS-REFERENCE TO RELATED APPLICATIONS

This application is a Continuation Application of PCT Application No. PCT/JP2020/046753, filed Dec. 15, 2020 and based upon and claiming the benefit of priority from Japanese Patent Application No. 2020-010235, filed Jan. 24, 2020, the entire contents of all of which are incorporated herein by reference.

FIELD

Embodiments described herein relate generally to a light control device and an illumination device.

BACKGROUND

In recent years, light control devices using liquid crystal cells have been proposed. Such light control devices are mainly of a type which converge or diverge a single polarization component. An example discloses a light control device in which two liquid crystal cells are stacked, one polarization component is modulated in one liquid crystal cell and the other polarization component is modulated in the other liquid crystal cell. In another example, such a technique is known that a plurality of liquid crystal lenses overlap each other, and strip electrodes of one liquid crystal lens and strip electrodes of another liquid crystal lens overlap respectively but to be deviated from each other, so as to finely dispose the strip electrodes in a pseudo manner.

In configurations where electrodes are disposed to oppose each other via a liquid crystal layer, high precision is required in adhering a pair of substrates to each other.

BRIEF DESCRIPTION OF THE DRAWINGS

FIG. 2 is an exploded perspective view of a light control device 200.

FIG. 6 is a cross-sectional view of the first liquid crystal cell 10 shown in FIG. 5 taken along line A-B.

DETAILED DESCRIPTION

Figure 1:
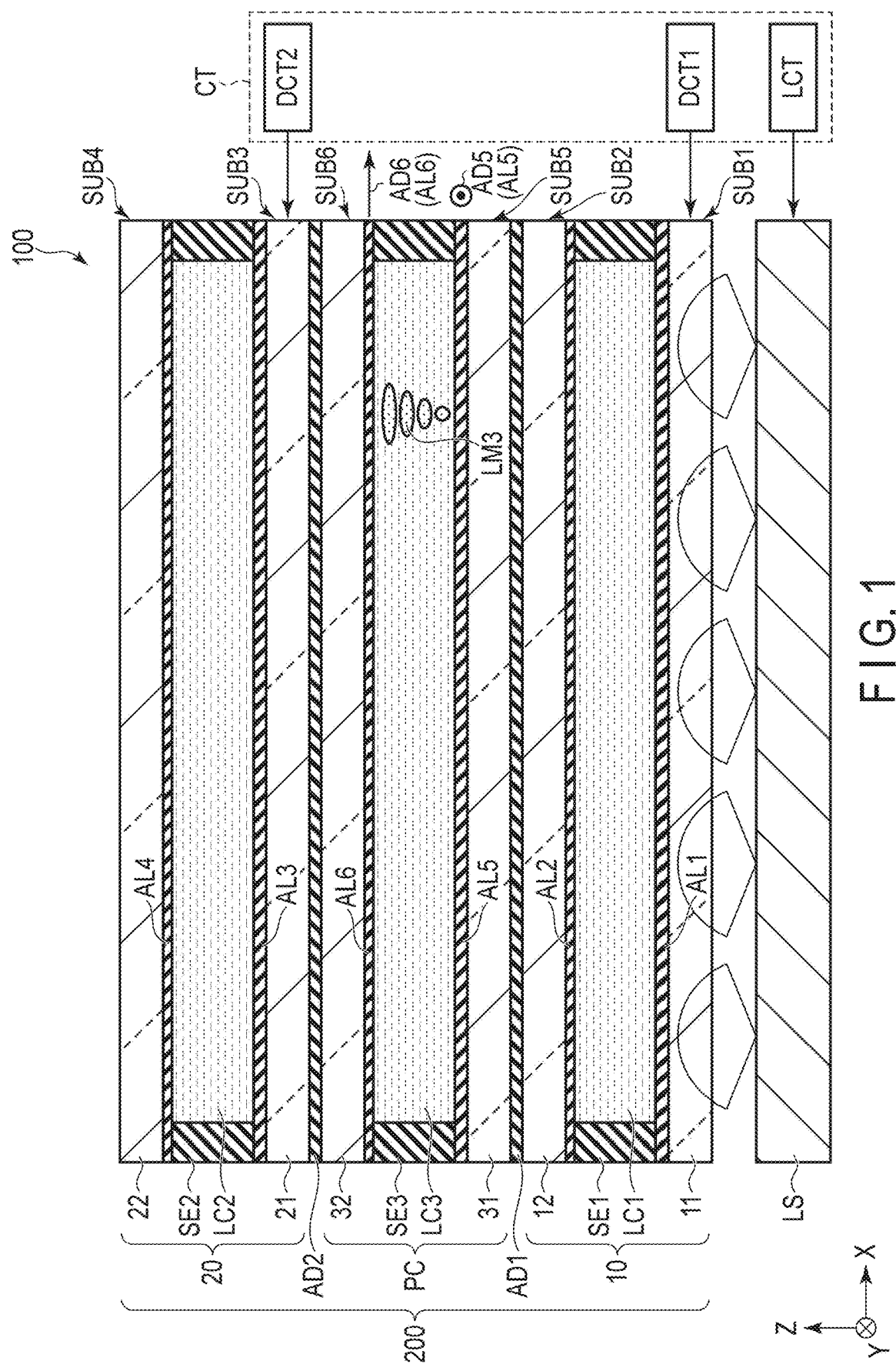
FIG. 1 is a diagram showing a configuration example of an illumination device 100 according to an embodiment.

In general, according to one embodiment, a light control device comprises a first liquid crystal cell comprising a first liquid crystal layer between a pair of substrates, a second liquid crystal cell comprising a second liquid crystal layer between a pair of substrates and a polarized light conversion element disposed between the first liquid crystal cell and the second liquid crystal cell, and one of the pair of substrates of each of the first liquid crystal cell and the second liquid crystal cell comprises an insulating substrate, a plurality of first electrodes arranged along one direction on the insulating substrate and formed in a strip shape, a first inorganic insulating film which covers the plurality of first electrodes and a plurality of second electrodes which intersect the first electrodes on the first inorganic insulating film and are formed in a strip shape.

According to another embodiment, a light control device comprises a first liquid crystal cell comprising a first liquid crystal layer between a pair of substrates, a second liquid crystal cell comprising a second liquid crystal layer between a pair of substrates and a polarized light conversion element disposed between the first liquid crystal cell and the second liquid crystal cell, and one of the pair of substrates of each of the first liquid crystal cell and the second liquid crystal cell comprises an insulating substrate, a flat plate-shaped first electrode disposed on the insulating substrate, a first inorganic insulating film which covers the first electrode and a plurality of second electrodes disposed concentrically on the first inorganic insulating film and overlapping the first electrode.

According to still another embodiment, an illumination device comprises a light source and the above-described light control device configured to control light emitted from the light source.

According to the embodiments, it is possible to provide a light control device and an illumination device, which can reduce the manufacturing cost.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 is a diagram showing a configuration example of the illumination device 100 of one embodiment. For example, a first direction X, a second direction Y and a third direction Z are orthogonal to each other, but they may intersect at an angle other than 90°. The first direction X and the second direction Y correspond to directions parallel to the substrate included in the illumination device 100, and the third direction Z corresponds to the thickness direction of the illumination device 100. In this embodiment, viewing on the X-Y plane defined by the first direction X and the second direction Y is referred to as a plane view.

The illumination device 100 includes a light source LS, a light control device 200 configured to control light emitted from the light source LS and a controller CT. The light source LS emits light along the third direction Z. The light emitted from the light source LS is, for example, non-polarized light. The light control device 200 overlaps the light source LS in the third direction Z. The light control device 200 comprises a first liquid crystal cell 10, a second liquid crystal cell 20 and a polarized light conversion element PC. The first liquid crystal cell 10 and the second liquid crystal cell 20 include structural components substantially identical to each other, but may include different components. The polarized light conversion element PC is disposed between the first liquid crystal cell 10 and the second liquid crystal cell 20.

The first liquid crystal cell 10 comprises a first substrate SUB1, a second substrate SUB2 and a first liquid crystal layer LC1. The first substrate SUB1 comprises an insulating substrate 11 and a first alignment film AL1. The light source LS is disposed so as to oppose the insulating substrate 11 in the third direction Z. The second substrate SUB2 comprises an insulating substrate 12 and a second alignment film AL2 which covers the insulating substrate 12. The first liquid crystal layer LC1 is held between the first substrate SUB1 and the second substrate SUB2 and is in contact with the first alignment film AL1 and the second alignment film AL2. The first liquid crystal layer LC1 is sealed by a sealant SE1.

The second liquid crystal cell 20 comprises a third substrate SUB3, a fourth substrate SUB4 and a second liquid crystal layer LC2. The third substrate SUB3 comprises an insulating substrate 21 and a third alignment film AL3. The fourth substrate SUB4 comprises an insulating substrate 22 and a fourth alignment film AL4 which covers the insulating substrate 22. The second liquid crystal layer LC2 is held between the third substrate SUB3 and the fourth substrate SUB4 and is in contact with the third alignment film AL3 and the fourth alignment film AL4. The second liquid crystal layer LC2 is sealed by a sealant SE2. In the second liquid crystal cell 20 with such a configuration, the third substrate SUB3 includes structural components identical to those of the first substrate SUB1, and the fourth substrate SUB4 includes structural components identical to those of the second substrate SUB2. Further, the configuration of the second liquid crystal layer LC2 is identical to that of the first liquid crystal layer LC1.

The polarized light conversion element PC comprises a fifth substrate SUB5, a sixth substrate SUB6 and a third liquid crystal layer LC3. The fifth substrate SUB5 comprises an insulating substrate 31 and a fifth alignment film AL5 which covers the insulating substrate 31. The sixth substrate SUB6 comprises an insulating substrate 32 and a sixth alignment film AL6 which covers the insulating substrate 32. The third liquid crystal layer LC3 is held between the fifth substrate SUB5 and the sixth substrate SUB6 and is in contact with the fifth alignment film AL5 and the sixth alignment film AL6. The third liquid crystal layer LC3 is sealed by a sealant SE3. The fifth alignment film AL5 and the sixth alignment film AL6 are horizontal alignment films having an alignment restriction force substantially parallel to the X-Y plane, and are subjected to an alignment treatment along a predetermined direction. Note that the alignment treatment may be a rubbing treatment or a photo-alignment treatment. The alignment treatment direction of the fifth alignment film AL5 intersects the alignment treatment direction of the sixth alignment film AL6. The third liquid crystal layer LC3 contains liquid crystal molecules LM3 twist-aligned between the fifth alignment film AL5 and the sixth alignment film AL6. The polarized light conversion element PC with such a configuration does not comprise electrodes. Therefore, no electric field is generated in the third liquid crystal layer LC3, and the alignment state of the liquid crystal molecules LM3 is maintained by the alignment restriction force of the fifth alignment film AL5 and the sixth alignment film AL6.

The insulating substrates 11 and 12, the insulating substrates 21 and 22 and the insulating substrates 31 and 32 are, for example, transparent substrates such as glass substrates and/or resin substrates.

The polarized light conversion element PC overlaps the first liquid crystal cell 10 in the third direction Z. The insulating substrate 12 and the insulating substrate 31 are adhered to each other by a transparent adhesive layer AD1. The refractive index of the adhesive layer AD1 is equivalent to those of the insulating substrates 12 and 31.

The second liquid crystal cell 20 overlaps the polarized light conversion element PC in the third direction Z. The insulating substrate 32 and the insulating substrate 21 are adhered to each other by a transparent adhesive layer AD2. The refractive index of the adhesive layer AD2 is equivalent to those of the insulating substrates 32 and 21.

The controller CT comprises a light source controller LCT and voltage controllers DCT1 and DCT2. The light source controller LCT controls the value of current which drives the light source LS, for example. The voltage controller DCT1 controls the voltage to be applied to the first liquid crystal layer LC1. The voltage controller DCT2 controls the voltage to be applied to the second liquid crystal layer LC2.

Now, the role of the polarized light conversion element PC will be explained here.

In the polarized light conversion element PC, for example, the alignment treatment direction AD5 of the fifth alignment film AL5 is parallel to the second direction Y, and the alignment treatment direction AD6 of the sixth alignment film AL6 is parallel to the first direction X. In other words, the alignment treatment direction AD5 is orthogonal to the alignment treatment direction AD6. The liquid crystal molecules LM3 is twist-aligned by 90° by the alignment restriction force of the fifth alignment film AL5 and the sixth alignment film AL6 between the fifth alignment film AL5 and the sixth alignment film AL6. The polarized light conversion element PC with such a configuration has an optical rotatory power that rotate the polarization plane of the polarization components (linearly polarized light) of the incident light 90°. For example, the polarized light conversion element PC converts the first polarization component of the incident light into the second polarization component and converts the second polarization component of the incident light into the first polarization component. The polarization plane of the first polarization component is orthogonal to the polarization plane of the second polarization component. When the proceeding direction of light is along the third direction Z, the polarization component having a polarization plane along the first direction X is referred to as first polarization light (P polarization light) POL1, and the polarization component having a polarization plane along the second direction Y is referred to as second polarization light (S polarization light) POL2. For example, the first polarization component is the first polarization light POL1 and the second polarization component is the second polarization light POL2.

Here, the embodiment is described on the assumption of the case where the polarized light conversion element PC is a twisted nematic liquid crystal element which does not comprise electrodes is described, the configuration is not limited to this case. That is, the polarized light conversion element PC may be of some other type which has the function of converting the first polarization component of the incident light into the second polarization component and also converting the second polarization component of the incident light into the first polarization component.

First Configuration Example

FIG. 2 is an exploded perspective view of the light control device 200. Note that FIG. 2 illustrates only the main portion.

In the first liquid crystal cell 10, the first substrate SUB1 comprises a plurality of first electrodes E1 and a plurality of second electrodes E2. The first electrodes E1 are arranged in the first direction X. Each of the first electrodes E1 extends along the second direction Y and is formed in a strip shape. The second electrodes E2 are arranged along the second direction Y and intersect the first electrodes E1. Each of the second electrodes E2 extends along the first direction X and is formed in a strip shape. The second substrate SUB2, indicated by in dotted lines, do not comprise electrodes, but it may comprise a common electrode opposing the first electrodes E1 and the second electrodes E2.

The first electrodes E1 are electrically connected to a voltage supply unit VS1. Of the first electrodes E1, different voltages may be supplied to adjacent ones of these, or the same voltage may be supplied to all the first electrodes E1.

The second electrodes E2 are electrically connected to a voltage supply unit VS2. Of the second electrodes E2, different voltages may be supplied to adjacent ones of these, or the same voltage may be supplied to all the second electrodes E2. For example, the voltage supply unit VS2 supplies a voltage to the second electrodes E2, which is different from that supplied to the first electrode E1, but may supply the same voltage as the first electrode E1. The supply of voltage to the second electrodes E2 by the voltage supply unit VS2 may be carried out at the same time as that of the supply of voltage to the first electrodes E1 by the voltage supply unit VS1, or it may be performed at a different timing. The voltage supply to the first electrodes E1 and the voltage supply to the second electrodes E2 may be carried out alternately.

In the second liquid crystal cell 20, the third substrate SUB3 comprises a plurality of electrodes E11 and a plurality of electrodes E12. The electrodes E11 are arranged in the first direction X. Each of the electrodes E11 extends along the second direction Y and is formed in a strip shape. The electrodes E12 are arranged in the second direction Y and intersect the electrodes E11. Each of the electrodes E12 extends along the first direction X and is formed in a strip shape. For example, the electrodes E11 overlap the first electrodes E1, respectively, in the third direction Z, and the electrodes E12 overlap the second electrodes E2, respectively, in the third direction Z. The electrodes E11 may be displaced relative to the respective first electrodes E1 along the first direction X and the electrode E12 may be displaced relative to the respective second electrodes E2 along the second direction Y. The extending direction of the electrodes E11 may not be parallel to the extending direction of the first electrodes E1, and the extending direction of the electrodes E12 may not be parallel to the extending direction of the second electrodes E2. The fourth substrate SUB4, indicated by the dotted line, does not comprises electrodes, but it may comprise a common electrode opposing the electrodes E11 and the electrodes E12.

The electrodes E11 are electrically connected to a voltage supply unit VS11, and the electrodes E12 are electrically connected to a voltage supply unit VS12. For example, the voltage supply unit VS12 supplies a voltage to each of the electrodes E12, which is different from a voltage supplied to the electrodes E11, but there may be a case where the voltage supplied to the electrodes E11 may be supplied. The voltage supply to the electrodes E12 by the voltage supply unit VS12 may be carried out at the same time as the voltage supply to the electrodes E11 by the voltage supply unit VS11, or it may be carried out at a different timing. The voltage supply to the electrodes E11 and the voltage supply to the electrodes E12 may be carried out alternately. The voltage supply to the first electrodes E1 and the voltage supply to the electrode E11 may be carried out at the same time, and the voltage supply to the second electrodes E2 and the voltage supply to the electrodes E12 may be carried out at the same time. The voltage supply to the first electrodes E1 and the electrodes E11 and the voltage supply to the second electrodes E2 and the electrodes E12 may be carried out alternately.

Note that in the first configuration example shown in FIG. 2, the first electrode E1 and the second electrode E2 are orthogonal to each other, but may intersect at an angle other than 90°.

Figure 3:
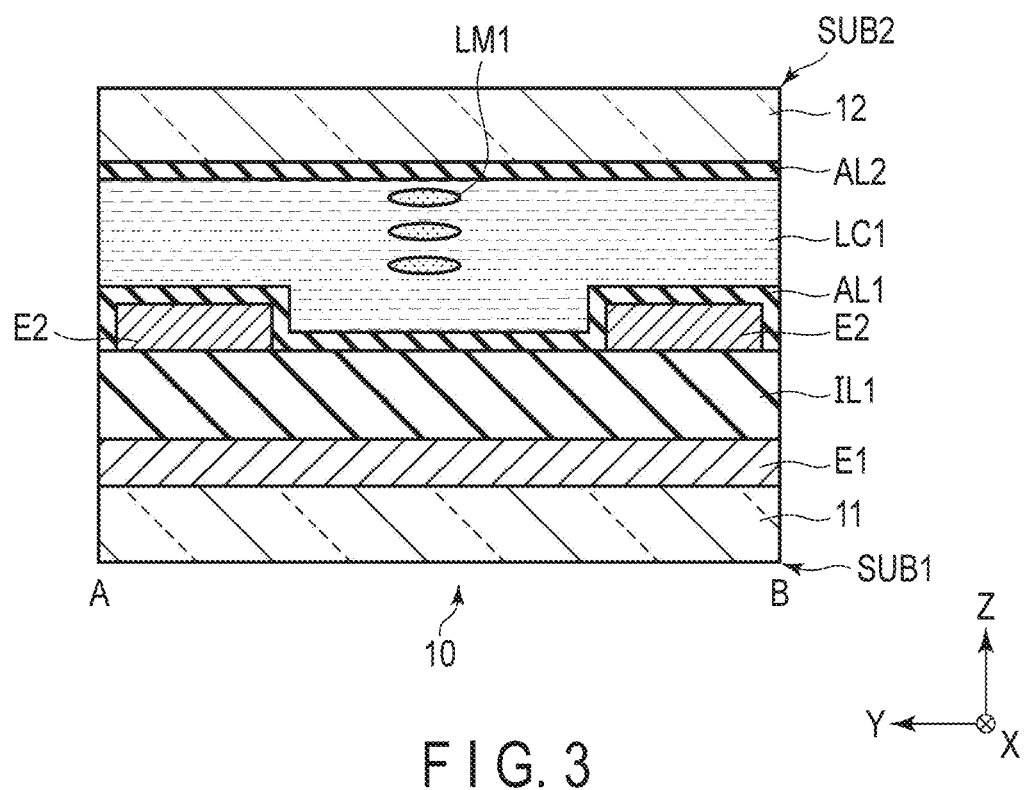
FIG. 3 is a cross-sectional view of a first liquid crystal cell 10 shown in FIG. 2 taken along line A-B.

FIG. 3 is a cross-sectional view of the first liquid crystal cell 10 shown in FIG. 2 taken along line A-B.

In the first substrate SUB1, the first electrode E1 is disposed on the insulating substrate 11 and covered by an insulating film IL1. The second electrode E2 is disposed on the insulating film IL1 and covered by the first alignment film AL1. The first electrode E1 and the second electrode and E2 are transparent electrodes formed of a transparent conductive material such as indium tin oxide (ITO) and indium zinc oxide (IZO). The insulating film IL1 corresponds to a transparent first inorganic insulating film formed of silicon oxide, silicon nitride or the like. The insulating film IL1 may be a transparent organic insulating film. At least one of an inorganic insulating film and an organic insulating film may be disposed between the insulating substrate 11 and the first electrode E1.

The first alignment film AL1 and the second alignment film AL2 are horizontal alignment films and are subjected to alignment treatment in a predetermined direction. For example, the alignment treatment direction of the first alignment film AL1 is substantially parallel to the alignment treatment direction of the second alignment film AL2. The first liquid crystal layer LC1 contains liquid crystal molecules LM1 that are homogeneously aligned (horizontally aligned) between the first alignment film AL1 and the second alignment film AL2. For example, the first liquid crystal layer LC1 is of a positive type having positive dielectric anisotropy, but may be of a negative type having negative dielectric anisotropy.

With reference to FIG. 3, the cross-sectional configuration of the first liquid crystal cell 10 is described, and note here that the second liquid crystal cell 20 has a cross-sectional configuration similar to that of the first liquid crystal cell 10.

Incidentally, when the voltage controller DCT1 supplies a predetermined voltage to each of the first electrode E1 and the second electrode E2, an electric field is formed in the first liquid crystal layer LC1, and the liquid crystal molecules LM1 are aligned so that their longitudinal axes are along the electric field.

The liquid crystal molecule LM1 have a refractive index anisotropy Δn. Therefore, the first liquid crystal layer LC1, which is in an on state where the electric field is formed, has a refractive index distribution according to the alignment state of the liquid crystal molecules LM1. Or, when the thickness of the first liquid crystal layer LC1 along the third direction Z is represented by d, the first liquid crystal layer LC1 has a retardation distribution expressed by: Δn·d. Such a refractive index distribution or retardation distribution forms a liquid crystal lens. That is, the liquid crystal lens here is equivalent to a refractive index distribution-type lens formed in the first liquid crystal layer LC1. The first liquid crystal cell 10 in which such a liquid crystal lens is formed, refracts (converges and diverges) incident light, thereby generating an optical effect of scattering the incident light. The degree of scattering (modulation rate) is controlled by the voltage applied to the first liquid crystal layer LC1. In other words, the modulation rate in the first liquid crystal cell 10 is controlled by the voltage controller DCT1.

Here, the first liquid crystal cell 10 is described, but as described above, the second liquid crystal cell 20 includes the same components as those of the first liquid crystal cell 10. Therefore, a liquid crystal lens similar to that of the first liquid crystal cell 10 can be formed in the second liquid crystal cell 20 as well when in the on state. The modulation rate in the second liquid crystal cell 20 is controlled by the voltage controller DCT2.

Figure 4:
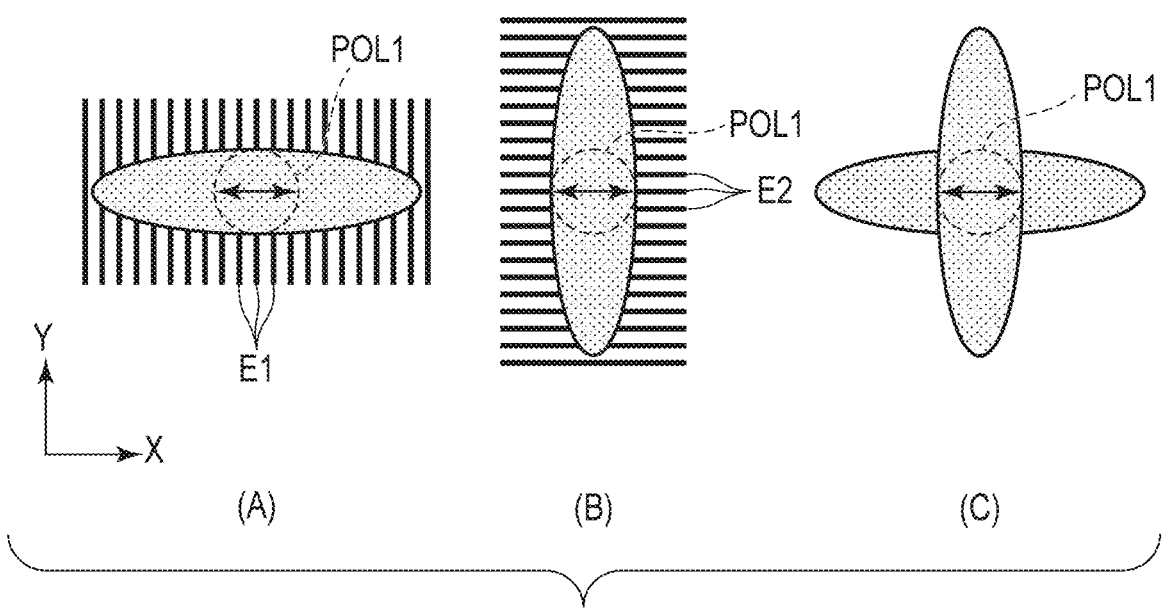
FIG. 4 is a diagram for illustrating an optical action in the first liquid crystal cell 10.

FIG. 4 is a diagram illustrating the optical action in the first liquid crystal cell 10.

FIG. 4, part (A), is a diagram illustrating the optical action of the first electrodes E1 arranged in the first direction X. It is assumed here that, for example, different voltages are supplied to adjacent first electrodes E1, respectively, and the electric field created between these first electrodes E1 acts on the first liquid crystal LC1. A refractive index distribution is formed in the first liquid crystal layer LC1 by the electric field from the first electrode E1. Of the light incident on the first liquid crystal layer LC1 having such a structure, for example, the first polarized light POL1 is scattered in a direction substantially orthogonal to the extending direction of the first electrodes E1. When the first electrodes E1 extend along the second direction Y, the first polarized light POL1 is scattered in the first direction X.

FIG. 4, part (B), is a diagram illustrating the optical action of the second electrodes E2 arranged in the second direction Y. It is assumed here that, for example, different voltages are supplied to adjacent second electrodes E2, respectively, and the electric field created between these second electrodes E2 acts on the first liquid crystal LC1. A refractive index distribution is formed in the first liquid crystal layer LC1 by the electric field from the second electrode E2. Of the light incident on the first liquid crystal layer LC1 having such a structure, for example, the first polarized light POL1 is scattered in the second direction Y substantially orthogonal to the first direction X, which is the extending direction of the second electrodes E2.

Therefore, as shown in FIG. 4, part (C), the first polarized light POL1 is scattered in at least four directions in the X-Y plane.

Here, the optical action in the first liquid crystal cell 10 has been described, and note that in the second liquid crystal cell 20 as well, an optical action similar to that of the first liquid crystal cell 10 is realized. With reference to FIG. 1, the light emitted from the light source LS is made incident on the first liquid crystal cell 10. Of the incident light, a polarization component (for example, the first polarized light POL1) is scattered in multiple directions in the liquid crystal cell 10. Of the incident light, a polarization component (for example, the second polarized light POL2) transmitted through the liquid crystal cell 10 without substantially being scattered therein is rotated in its polarization plane by 90° in the polarized light conversion element PC. In other words, the second polarized light POL2 transmitted through the first liquid crystal cell 10 is converted into the first polarized light POL1 in the polarized light conversion element PC. The light transmitted through the polarized light conversion element PC is made incident on the second liquid crystal cell 20. The first polarized light POL1 converted in the polarized light conversion element PC is scattered in multiple directions in the second liquid crystal cell 20. Thus, the first polarization component and the second polarization component of the light emitted from the light source LS are both scattered in multiple directions in the light control device 200.

In the first liquid crystal cell 10 and the second liquid crystal cell 20, which constitute the light control device 200, one substrate of each is provided with a plurality of electrode layers, whereas the other substrate of each of the first liquid crystal cell 10 and the second liquid crystal cell 20 is not provided with electrodes (or the other substrate may be provided with a solid electrode which is not finely patterned). Therefore, when attaching the one substrate to the other, high-precision alignment is not required, or an expensive equipment is not needed. Thus, the manufacturing costs can be reduced.

Further, the first liquid crystal cell 10 and the second liquid crystal cell 20 comprise the same components, and as compared to the case where the first liquid crystal cell 10 and the second liquid crystal cell 20 are configured with different specifications, the manufacturing lines can be unified and the light control device 200 can be manufactured at a lower cost.

Second Configuration Example

Figure 5:
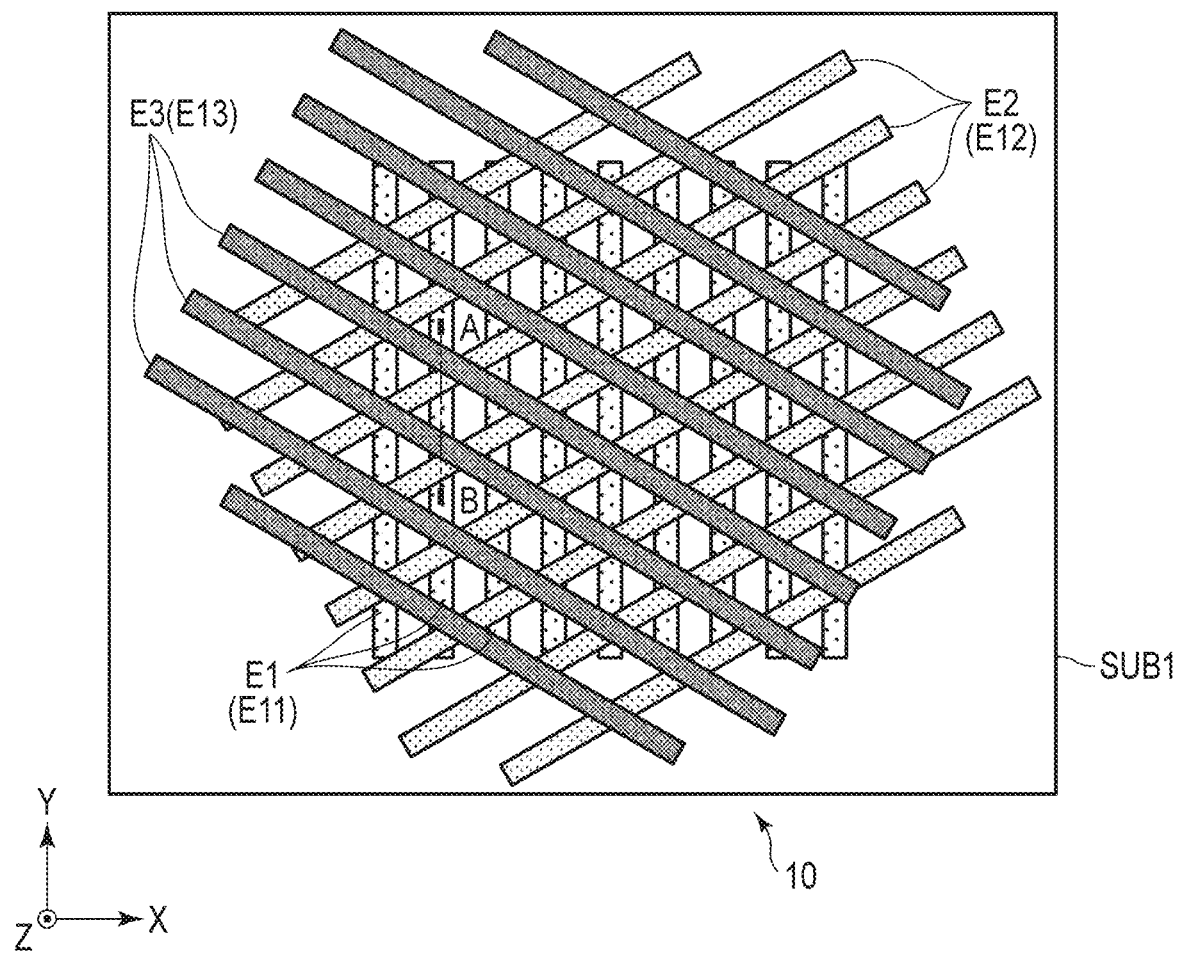
FIG. 5 is a plan view showing a second configuration example of the first liquid crystal cell 10.

FIG. 5 is a plan view showing the second configuration example of the first liquid crystal cell 10. The second configuration example shown in FIG. 5 is different from the first configuration example of FIG. 2 in that the first substrate SUB1 further comprises third electrodes E3. That is, the first electrodes E1 are arranged in the first direction X. Each of the first electrodes E1 extends along the second direction Y and is formed in a strip shape. The second electrodes E2 are arranged along a direction different from that of the first electrodes E1. Each of the second electrodes E2 is formed in a strip shape and intersects the first electrodes E1. The third electrodes E3 are arranged in a direction different from those of the first second electrodes E1 and the second electrodes E2. Each of the third electrodes E3 is formed in a strip shape and intersects the first electrodes E1 and the second electrodes E2. In the second configuration example shown in FIG. 5, the first electrodes E1, the second electrodes E2 and the third electrodes E3 intersect each other at 60° in the X-Y plane. Note that the first electrodes E1, the second electrodes E2 and the third electrodes E3 may intersect at an angle other than 60°.

FIG. 6 is a cross-sectional view of the first liquid crystal cell 10 shown in FIG. 5 taken along line A-B. In the first substrate SUB1, the first electrodes E1 are disposed on the insulating substrate 11 and covered by the insulating film IL1. The second electrodes E2 are disposed on the insulating film IL1 and covered by the insulating film IL2. The third electrodes E3 are disposed on the insulating film IL2 and covered by the first alignment film AL1. The third electrodes E3 are transparent electrodes each formed of a transparent conductive material such as indium tin oxide (ITO) or indium zinc oxide (IZO). The insulating film IL2 corresponds to a transparent second inorganic insulating film formed of silicon oxide, silicon nitride or the like.

With reference to FIGS. 5 and 6, the second configuration example of the first liquid crystal cell 10 has been described. Note that the second liquid crystal cell 20 has a structure similar to that of the first liquid crystal cell 10, and the second liquid crystal cell 20 comprises electrodes E11 overlapping the first electrodes E1, electrodes E12 overlapping the second electrodes E2 and electrodes E13 overlapping the third electrodes E3.

Figure 7:
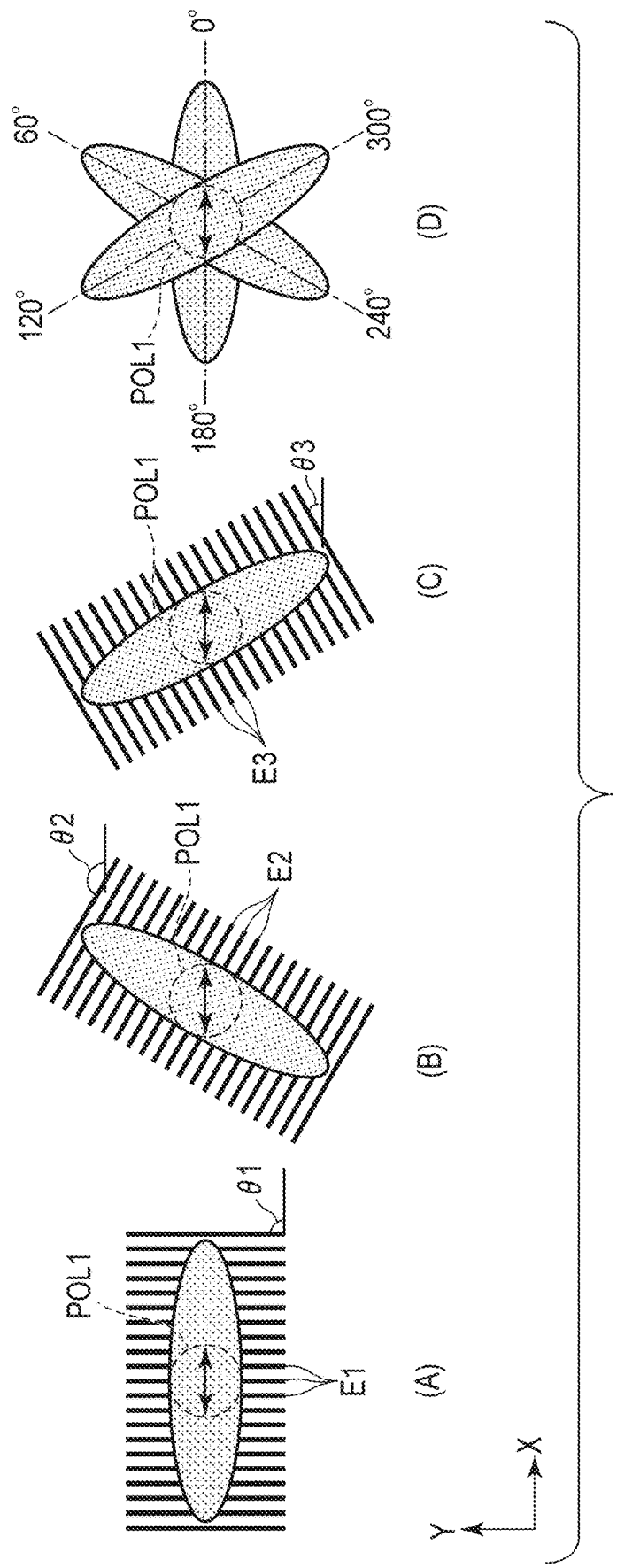
FIG. 7 is a diagram illustrating the optical action in the first liquid crystal cell 10.

FIG. 7 is a diagram illustrating the optical action in the first liquid crystal cell 10. Here, the direction in the X-Y plane is defined with respect to the first direction X. The first electrodes E1 each extend in a direction whose angle θ1 with respect to the first direction X is 90°. The second electrodes E2 each extend in a direction whose angle θ2 with respect to the first direction X is 150°. The third electrodes E3 each extend in a direction whose angle θ3 with respect to the first direction X is 30°.

FIG. 7, part (A), is a diagram illustrating the optical action of the first electrodes E1. Of the light incident on the first liquid crystal layer LC1, the first polarized light POL1 is scattered in a direction of 0°-180° in the X-Y plane.

FIG. 7, part (B), is a diagram illustrating the optical action of the second electrodes E2. Of the light incident on the first liquid crystal layer LC1, the first polarized light POL1 is scattered in a direction of 60°-240° in the X-Y plane.

FIG. 7, part (C), is a diagram illustrating the optical action of the third electrodes E3. Of the light incident on the first liquid crystal layer LC1, the first polarized light POL1 is scattered in a direction of 120°-300° in the X-Y plane.

Thus, as shown in FIG. 7, part (D), the first polarized light POL1 is scattered in at least six directions in the X-Y plane.

Here, the optical action of the first liquid crystal cell 10 has been described, but in the second liquid crystal cell 20 as well, an optical action similar to that of the first liquid crystal cell 10 can be realized. Therefore, in the second configuration example, an advantageous effect similar to those of the first configuration example can be obtained. Further, the light incident on the light control device 200 is scattered in more directions.

Third Configuration Example

Figure 8:
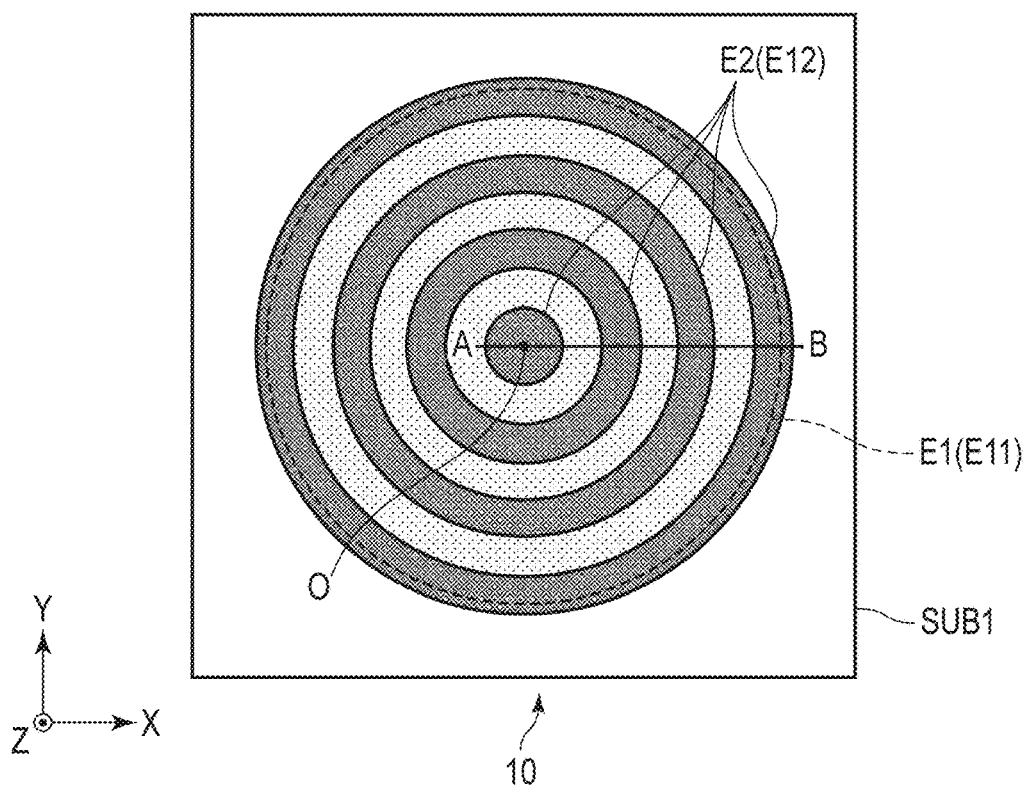
FIG. 8 is a plan view showing a third configuration example of the first liquid crystal cell 10.

FIG. 8 is a plan view showing the third configuration example of the first liquid crystal cell 10. The third configuration example shown in FIG. 8 is different from the first configuration example of FIG. 2 in the shapes of a first electrode E1 and second electrodes E2. More specifically, the first electrode E1 is formed in a flat plate shape in the X-Y plane. The second electrodes E2 are concentrically arranged so as to overlap the first electrodes E1. The gap between each adjacent pair of the second electrodes E2 overlaps the first electrode E1. The center O of the first electrode E1 and the second electrodes E2 overlap on each other in the X-Y plane. In the example shown in FIG. 8, the first electrode E1 is formed in a circular shape. But the shape is not limited to that of the example shown in the figure as long as it is formed between each adjacent pair of the second electrodes E2. For example, the first electrode E1 may be formed in a rectangular shape to match the rectangular first substrate SUB1, or formed in other polygonal shapes.

Figure 9:
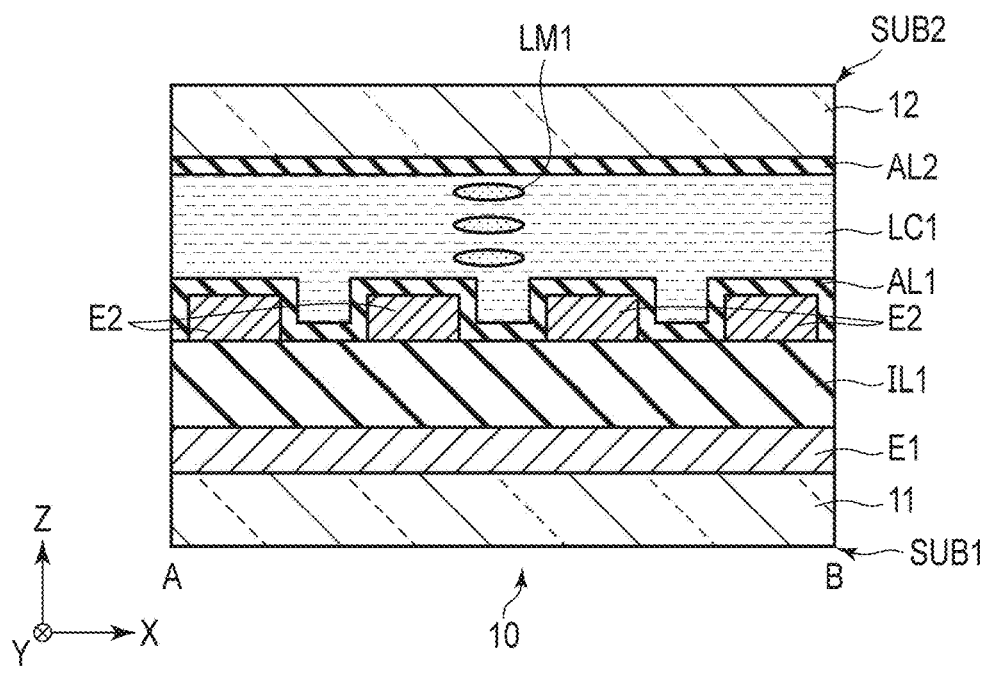
FIG. 9 is a cross-sectional view of the first liquid crystal cell 10 shown in FIG. 8 taken along line A-B.

FIG. 9 is a cross-sectional view of the first liquid crystal cell 10 shown in FIG. 8 taken along line A-B. In the first substrate SUB1, the first electrode E1 is disposed on the insulating substrate 11 and covered by the insulating film IL1. The second electrodes E2 are disposed on the insulating film IL1 and covered by the first alignment film AL1.

With reference to FIGS. 8 and 9, the third configuration example of the first liquid crystal cell 10 has been described. Note that the second liquid crystal cell 20 has a structure similar to that of the first liquid crystal cell 10, and the second liquid crystal cell 20 comprises electrodes E11 overlapping the first electrode E1 and electrodes E12 overlapping the second electrodes E2.

In the third configuration example as well, an advantageous effect similar to that of the first configuration example can be obtained. Further, the light incident on the light control device 200 is scattered in substantially all directions in the X-Y plane.

Fourth Configuration Example

Figure 10:
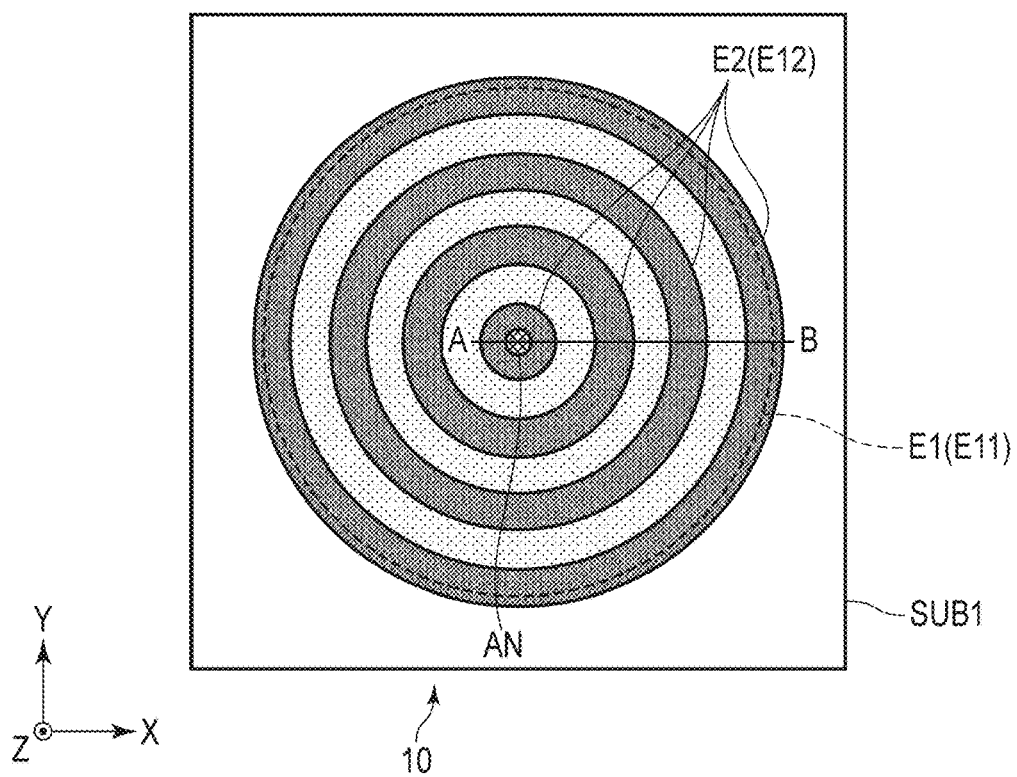
FIG. 10 is a plan view showing a fourth configuration example of the first liquid crystal cell 10.

FIG. 10 is a plan view of the fourth configuration example of the first liquid crystal cell 10. The fourth configuration example shown in FIG. 10 is different from the third configuration example of FIG. 8 in that an alignment nucleus AN is provided. The alignment nucleus AN is disposed to overlap the second electrode E2 located at the center among the plurality of second electrodes E2. It suffices if the alignment nucleus AN is located in the vicinity of substantially the center portion of the second electrode E2 and here no high-precision alignment is required.

Figure 11:
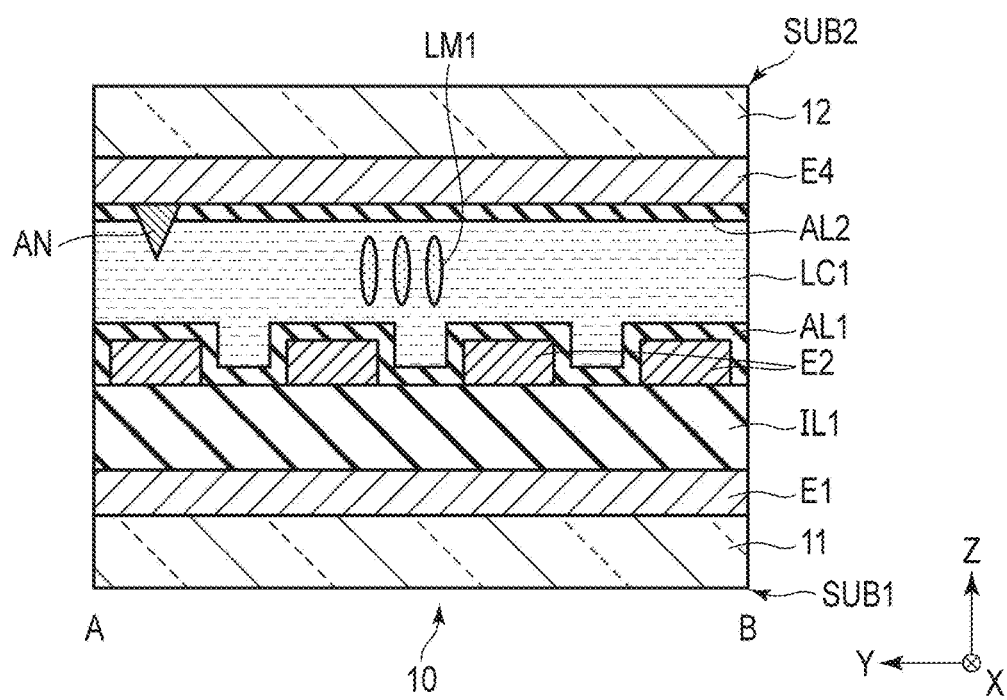
FIG. 11 is a cross-sectional view of the first liquid crystal cell 10 shown in FIG. 10 taken along the A-B line.

FIG. 11 is a diagram showing the first liquid crystal cell 10 shown in FIG. 10 taken along line A-B. The first alignment film AL1 and the second alignment film AL2 are vertical alignment films having an alignment restriction force along the normal of the liquid crystal cell 10. The first liquid crystal layer LC1 is, for example, of a negative type. The liquid crystal molecules LM1 of the first liquid crystal layer LC1 are arranged so that their longitudinal axes are along the third direction Z when no voltage is being applied.

The second substrate SUB2 comprises a fourth electrode E4 and an alignment nucleus AN. The fourth electrode E4 is disposed between the insulating substrate 12 and the second alignment film AL2. The fourth electrode E4 is a solid electrode which has not been finely patterned. The fourth electrode E4 opposes the first electrode E1 and the second electrode E2 while interposing the first liquid crystal layer LC1 therebetween, and with this structure, an electric field can be formed between the first electrode E1 and itself, and also between the second electrode E2 and itself. In the fourth configuration example shown in FIG. 11, the alignment nucleus AN is a protrusion protruded from the second substrate SUB2 toward the first substrate SUB1, but it may as well be an opening penetrating the fourth electrode E4.

With reference to FIGS. 10 and 11, the fourth configuration example of the first liquid crystal cell 10 has been described. Note here that the second liquid crystal cell 20 as well has a configuration similar to that of the first liquid crystal cell 10, and the second liquid crystal cell 20 comprises an electrode E11 overlapping the first electrode E1, electrodes E12 overlapping the second electrode E2 and an alignment nucleus AN.

In the fourth configuration example having such a configuration, an advantageous effect similar to that of the third configuration example can be obtained. Further, with the alignment nucleus AN thus provided, the response speed of the liquid crystal molecules to the electric field can be improved.

As described above, according to this embodiment, it is possible to provide a light control device and an illumination device, which can reduce the manufacturing costs.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A light control device comprising:
a first liquid crystal cell comprising a first liquid crystal layer between a pair of substrates;
a second liquid crystal cell comprising a second liquid crystal layer between a pair of substrates; and
a polarized light conversion element disposed between the first liquid crystal cell and the second liquid crystal cell, wherein
one substrate of the pair of substrates of each of the first liquid crystal cell and the second liquid crystal cell comprises:
an insulating substrate;
a plurality of first electrodes arranged along one direction on the insulating substrate and formed in a strip shape;
a first inorganic insulating film covering the plurality of first electrodes; and
a plurality of second electrodes intersecting the first electrodes on the first inorganic insulating film and formed in a strip shape.

2. The light control device of claim 1, wherein the first electrodes and the second electrodes are orthogonal to each other.

3. The light control device of claim 1, wherein the one substrate further comprises:
a second inorganic insulating film covering the plurality of second electrodes, and
a plurality of third electrodes intersecting the first electrodes and the second electrodes on the second inorganic insulating film, and formed in a strip shape.

4. The light control device of claim 3, wherein the first electrodes, the second electrodes and the third electrodes intersect each other at 60°.

5. A light control device comprising:
a first liquid crystal cell comprising a first liquid crystal layer between a pair of substrates;
a second liquid crystal cell comprising a second liquid crystal layer between a pair of substrates; and
a polarized light conversion element disposed between the first liquid crystal cell and the second liquid crystal cell, wherein
one substrate of the pair of substrates of each of the first liquid crystal cell and the second liquid crystal cell comprises:
an insulating substrate;
a first electrode disposed on the insulating substrate and formed in a flat plate-shape;
a first inorganic insulating film covering the first electrode; and
a plurality of second electrodes disposed concentrically on the first inorganic insulating film and overlapping the first electrode.

6. The light control device of claim 5, wherein each of the first liquid crystal cell and the second liquid crystal cell comprises a pair of vertical alignment films.

7. The light control device of claim 6, wherein an other substrate of the pair of substrates of each of the first liquid crystal cell and the second liquid crystal cell comprises an alignment nucleus overlapping a second electrode located in a central portion of the plurality of second electrodes.

8. The light control device of claim 1, wherein the polarized light conversion element comprises a third liquid crystal layer between a pair of substrates, and the third liquid crystal layer contains twist-aligned liquid crystal molecules.

9. An illumination device comprising:
a light source; and
a light control device configured to control light emitted from the light source,
wherein
the light control device comprises:
a first liquid crystal cell comprising a first liquid crystal layer between a pair of substrates;
a second liquid crystal cell comprising a second liquid crystal layer between a pair of substrates; and
a polarized light conversion element disposed between the first liquid crystal cell and the second liquid crystal cell,
one substrate of the pair of substrates of each of the first liquid crystal cell and the second liquid crystal cell comprises:
an insulating substrate;
a plurality of first electrodes arranged along one direction on the insulating substrate and formed in a strip shape;
a first inorganic insulating film covering the plurality of first electrodes; and
a plurality of second electrodes intersecting the first electrodes on the first inorganic insulating film and formed in a strip shape.

10. The illumination device of claim 9, wherein the first electrodes and the second electrodes are orthogonal to each other.

11. The illumination device of claim 9, wherein the one substrate further comprises:
a second inorganic insulating film covering the plurality of second electrodes, and
a plurality of third electrodes intersecting the first electrodes and the second electrodes on the second inorganic insulating film, and formed in a strip shape.

12. The illumination device of claim 11, wherein the first electrodes, the second electrodes and the third electrodes intersect each other at 60°.

13. An illumination device comprising:
a light source; and
a light control device configured to control light emitted from the light source,
wherein
the light control device comprises:
a first liquid crystal cell comprising a first liquid crystal layer between a pair of substrates;
a second liquid crystal cell comprising a second liquid crystal layer between a pair of substrates; and
a polarized light conversion element disposed between the first liquid crystal cell and the second liquid crystal cell,
one substrate of the pair of substrates of each of the first liquid crystal cell and the second liquid crystal cell comprises:
an insulating substrate;
a first electrode disposed on the insulating substrate and formed in a flat plate-shape;
a first inorganic insulating film covering the first electrode; and
a plurality of second electrodes disposed concentrically on the first inorganic insulating film and overlapping the first electrode.

14. The illumination device of claim 13, wherein each of the first liquid crystal cell and the second liquid crystal cell comprises a pair of vertical alignment films.

15. The illumination device of claim 14, wherein an other substrate of the pair of substrates of each of the first liquid crystal cell and the second liquid crystal cell comprises an alignment nucleus overlapping a second electrode located in a central portion of the plurality of second electrodes.

16. The illumination device of claim 9, wherein
the polarized light conversion element comprises a third liquid crystal layer between a pair of substrates, and
the third liquid crystal layer contains twist-aligned liquid crystal molecules.

17. The illumination device of claim 13, wherein
the polarized light conversion element comprises a third liquid crystal layer between a pair of substrates, and
the third liquid crystal layer contains twist-aligned liquid crystal molecules.

18. The light control device of claim 5, wherein
the polarized light conversion element comprises a third liquid crystal layer between a pair of substrates, and
the third liquid crystal layer contains twist-aligned liquid crystal molecules.

* * * * *